March 21, 1961  E. J. VAN LARE ET AL  2,976,151
AZAMERODICARBOCYANINE DYES AND PHOTOGRAPHIC
EMULSIONS SENSITIZED THEREWITH
Filed Feb. 6, 1959

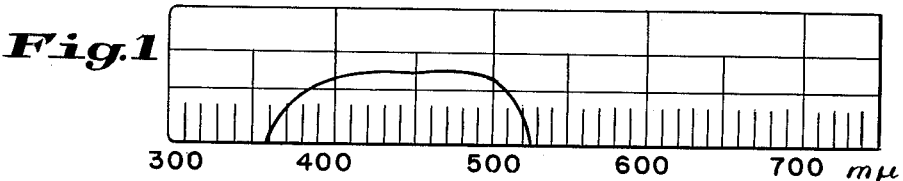

Fig.1

1,3- DIETHYL -5- [(3-ETHYL-2 (3H)-BENZOXAZOLYLIDENE)-
2-AZA-2- BUTENYLIDENE]-2-THIOBARBITURIC ACID

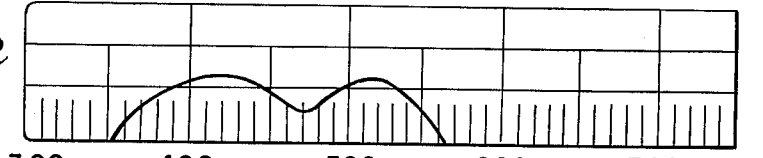

Fig.2

1,3- DIETHYL-5- [(3-ETHYL-2 (3H)- BENZOTHIAZOLYLIDENE)-2-
AZA-2- BUTENYLIDENE] -2- THIOBARBITURIC ACID

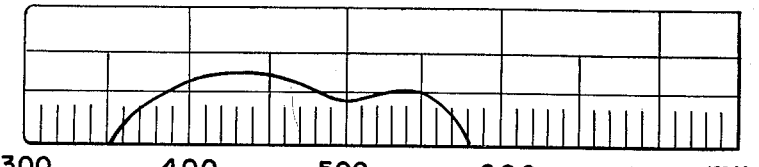

Fig.3

1,3- DIETHYL-5-[4-(1-ETHYL-2 (1H)-NAPHTHO [1,2] THIAZO-
LYLIDENE)-2-AZA-2- BUTENYLIDENE]-2-THIOBARBITURIC
ACID

Earl J.VanLare
Leslie G.S.Brooker
INVENTORS

BY R. Frank Smith
Lawrence H. Willis
ATTORNEYS

United States Patent Office 2,976,151
Patented Mar. 21, 1961

2,976,151

AZAMERODICARBOCYANINE DYES AND PHOTOGRAPHIC EMULSIONS SENSITIZED THEREWITH

Earl J. Van Lare and Leslie G. S. Brooker, Rochester, N.Y., assignors to Eastman Kodak Company, Rochester, N.Y., a corporation of New Jersey Filed Feb. 6, 1959, Ser. No. 791,658

14 Claims. (Cl. 96—102)

This invention relates to novel polymethine dyes, methods for making such dyes, and photographic silver halide emulsions sensitized by means of such polymethine dyes.

Polymethine dyes, including merocyanine dyes, have been previously described wherein the dye molecules contain a variety of heterocyclic nuclei. Merocyanine dyes containing one or more nitrogen atoms in the intracyclic chain have also been described. These latter dyes have frequently been referred to as azamerocyanine dyes signifying the presence of at least one nitrogen atom in the polymethine chain in a position normally occupied by a carbon atom.

It is also known that the replacement of a carbon atom in the polymethine chain of spectral sensitizing dyes by a nitrogen atom frequently results in a loss of sensitizing action. The results in sensitizing action is so great in some instances that the dyes become desensitizing dyes, and are consequently employed for their desensitizing action in certain special photographic processes, such as in the production of direct positive photographic images.

We have now found a new class of azamerodicarbocyanine dyes which have the useful property of sensitizing photographic silver halide emulsions. The novel dyes of our invention contain a thiobarbituric acid nucleus. It has been found that analogous dyes containing conventional 5-membered heterocyclic rings frequently do not have the useful sensitizing action of the dyes of our invention containing the 6-membered heterocyclic ring of thiobarbituric acid.

It is, therefore, an object of our inventon to provide a new class of polymethine dyes of the azamerodicarbocyanine class. Another object is to provide methods for making such novel dyes. Still another object is to provide photographic silver halide emulsions spectrally sensitized with the new azamerodicarbocyanine dyes of our invention. Other objects will become apparent from a consideration of the following description and examples.

Our new azamerodicarbocyanine dyes are frequently useful in sensitizing photographic silver halide emulsions, and the effect of three of the dyes of our invention in conventional photographic silver halide emulsions is illustrated diagrammatically in Figures 1–3 of the accompanying drawing. Further details regarding this useful sensitizing effect are given below.

The new azamerodicarbocyanine dyes of our invention can advantageously be represented by the following general formula:

(I) 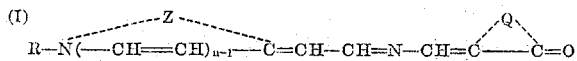

wherein R represents an alcohol radical, i.e., a substituted or unsubstituted alkyl group, such as methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β - phenylethyl, carboxymethyl, etc. (especially alkyl groups containing from 1 to 4 carbon atoms) $n$ represents a positive integer of from 1 to 2, Q represents the non-metallic atoms necessary to complete a 2-thiobarbituric acid nucleus, including their 1-alkyl (e.g., 1-methyl, 1-ethyl, 1-n-propyl, n-n-heptyl, etc.) or 1,3-dialkyl (e.g., 1,3-dimethyl, 1,3-diethyl, 1,3-di-n-propyl, 1,3-diisopropyl, 1,3-dicyclohexyl, 1,3-di(β-methoxyethyl), etc., or 1,3-diaryl (e.g., 1,3-diphenyl, 1,3-di(p-chlorophenyl), 1,3-di(p-ethoxycarbonylphenyl), etc., or 1-aryl (e.g., 1-phenyl, 1-p-chlorophenyl, 1-p-ethoxycarbonylphenyl, etc.), or 1-alkyl - 3 - aryl (e.g., 1-ethyl-3-phenyl, 1-n-heptyl-3-phenyl, etc.) derivatives, and Z represents the non-metallic atoms necessary to complete a heterocyclic nucleus containing from 5 to 6 atoms in the heterocyclic ring, such as those selected from the group consisting of a thiazole nucleus (e.g., thiazole, 4 - methylthiazole, 4 - phenylthiazole, 5 - methylthiazole, 5 - phenylthiazole, 4,5 - dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7 - chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2] thiazole, naphtho[2,1]-thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, etc.), a thianaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5 - chlorobenzoxazole, 5 - methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6 - hydroxybenzoxazole, etc.), a naphthoxazole nucleus (e.g., naphtho[1,2]oxazole, naphtho[2,1]oxazole, etc.), a selenazole nucleus (e.g., 4-methylselenazole, 4-phenylselenazole, etc.), a benzoselenazole nucleus (e.g., benzoselenazole, 5-chlorobenzoselenazole, 5 - methoxybenzoselenazole, 5 - hydroxybenzoselenazole, tetrahydrobenzoselenazole, etc.), a naphthoselenazole nucleus (e.g., naphtho[1,2]selenazole, naphtho[2,1]selenazole, etc.), a thiazoline nucleus (e.g., thiazoline, 4-methylthiazoline, etc.), a 2-quinoline nucleus e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a benzimidazole nucleus (e.g., 1,3-diethylbenzimidazole, 1-ethyl-3-phenylbenzimidazole, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 5-methylpyridine, etc.), a 4-pyridine nucleus (e.g., pyridine, etc.), etc.

The novel dyes represented by Formula I above can advantageously be prepared by condensing together a compound selected from those represented by the following general formula:

(II) 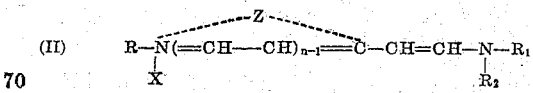

where R, $n$ and Z each have the values given above, X represents an acid radical, such as chloride, bromide, iodide, perchlorate, thiocyanate, benzenesulfonate, p-toluenesulfonate, methylsulfate, ethylsulfate, etc., $R_1$ represents a hydrogen atom or an acyl group (e.g., acetyl, propionyl, butyryl, benzoyl, etc.), and $R_2$ represents an aryl group (e.g. phenyl, tolyl, etc.), with a compound selected from those represented by the following general formula:

(III) 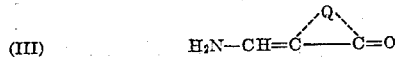

wherein Q has the values given above.

Alternatively, the compounds of Formula I above can be prepared by condensing together a compound selected from those represented by the following general formula:

(IV) 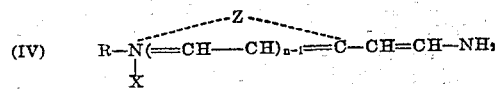

wherein R, X, n and Z each have the values given above, with a compound selected from those represented by the following general formula:

(V) 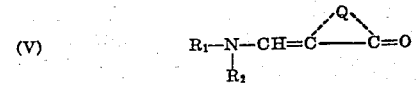

wherein $R_1$, $R_2$ and Q each have the values given above.

The condensation of the compounds of Formula II with those of Formula III, and the condensations of the compounds of Formula IV with those of Formula V, can be accelerated by heating. Temperatures varying from ambient temperature (ca. 20° C.) to the reflux temperature of the reaction mixture can be conveniently used. If desired, these condensations can be carried out in the presence of an inert diluent, such as pyridine, a lower alcohol (e.g., ethanol, propanol, isopropanol, butanol, isobutanol, etc.), nitrobenzene, etc. The condensations can be further accelerated through the addition of a basic condensing agent to the reaction mixture. Typical basic condensing agents include the trialkylamines (e.g., triethylamine, tripropylamine, triisopropylamine, tributylamine, triisobutylamine, etc.), the N,N-dialkylanilines (e.g., N,N-dimethylaniline, N,N-diethylaniline, etc.), the N-alkylpiperidines (e.g., N-methylpiperidine, N-ethylpiperidine, etc.), etc.

The compounds of Formula III above can advantageously be prepared by heating together a compound selected from those of Formula V with an alcoholic solution of ammonia. Analogously, the compounds of Formula IV can be prepared by heating together a compound of Formula II with an alcoholic solution of ammonia. Examples of such preparations are given in the following examples.

The following examples will serve to illustrate the preparation of the novel azamerodicarbocyanine dyes of our invention and the intermediates necessary for preparing such novel dyes. The examples also illustrate the preparation of azamerodicarbocyanine dyes, wherein Q of Formula I represents the non-metallic atoms necessary to complete a heterocyclic nucleus containing 5 atoms in the heterocyclic ring, such nuclei being ones commonly known to those skilled in the cyanine dye art. The preparations of these latter dyes are given in order that their sensitizing properties can be compared with the unexpected sensitizing action of the thiobarbituric acid dyes of the present invention.

*Example 1.—5-aminomethylene-3-ethylrhodanine*

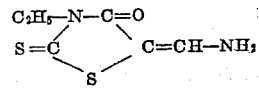

A suspension of 30.6 g. (1 mol.) of 5-acetanilidomethylene-3-ethylrhodanine in 150 ml. of a saturated solution of alcoholic ammonia was heated to boiling and boiled for five minutes with ammonia gas being continually introduced. The suspended solid all dissolved and the solution was filtered and the filtrate concentrated to 100 ml., then cooled, and the solid which separated was filtered off and washed with ethyl alcohol. The solid was discarded and the combined filtrate and washings were concentrated to 50 ml. and diluted with 400 ml. of water. An oil separated which gradually solidified. This solid was dissolved in benzene. The solid which separated on cooling was filtered off and also discarded. The benzene filtrate was concentrated to a small volume. The solid which separated on cooling was considered good material. A yield of 4.15 g. (22% yield) of light tan crystals was obtained, M.P. 90–93° C.

*Example 2.—3-ethyl-5-[4-(3-ethyl-2(3H)-benzoxazolylidene)-2-aza-2-butenylidene]rhodanine*

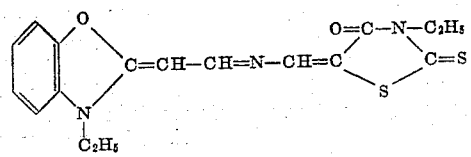

A mixture of 1.9 g. (1 mol.) of 5-aminomethylene-3-ethylrhodanine, 4.34 g. (1 mol.) of 2-β-acetanilidovinylbenzoxazole ethiodide, 15 ml. of ethyl alcohol and 1 g. (1 mol.) of triethylamine was refluxed for two minutes. The reaction mixture was cooled and the dye was filtered off and washed with ethyl alcohol. The yield of crude dye was 1.8 g. (50% yield) and the dye was purified by dissolving in hot pyridine and precipitating with methyl alcohol. The purplish crystals melted at 224–226° C. with decomposition.

*Analysis.*—Calc'd for $C_{17}H_{17}N_3O_2S_2$: C, 56.8; H, 4.8. Found: C, 57.0; H, 4.7.

*Example 3.—3-ethyl-5-[4-(3-ethyl-2(3H)-benzothiazolylidene)-2-aza-2-butenylidene]rhodanine*

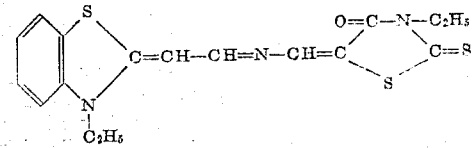

A mixture of 1.6 g. (1 mol.) of 5-acetanilidomethylene-3-ethylrhodanine, 1.6 g. (1 mol.) of 2-β-aminovinylbenzothiazole ethiodide, 15 ml. of ethyl alcohol and 0.5 g. (1 mol.) of triethylamine was refluxed for 30 minutes. The reaction mixture was cooled, the crude dye filtered off and extracted with 100 ml. of hot methyl alcohol which was discarded. The remaining dye was purified by dissolving in hot pyridine and precipitating with methyl alcohol. The yield of green crystals was 0.5 g. (3% yield), M.P. 192–193° C. with decomposition.

*Example 4.—3-ethyl-5-[4-(1-ethyl-2(1H)-naphtho[1,2]-thiazolylidene)-2-aza-2-butenylidene]rhodanine*

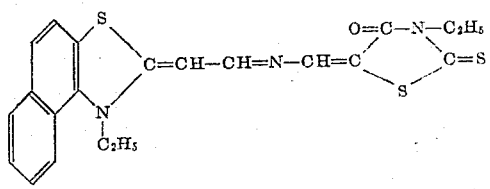

A mixture of 1.6 g. (1 mol.) of 5-acetanilidomethylene-3-ethylrhodanine, 2.1 g. (1 mol.) of 2-β-aminovinylnaphtho[1,2]-thiazole etho-p-toluenesulfonate, 20 ml. of ethyl alcohol and 0.5 g. (1 mol.) of triethylamine was refluxed for 30 minutes. The reaction mixture was cooled, the solid filtered off and washed with ethyl alcohol. The solid was extracted with two 100 ml. portions of hot methyl alcohol. The remaining crude dye was purified by dissolving in hot pyridine and precipitating with methyl alcohol. The yield or dark red crystals with a green reflex was 0.28 g. (13% yield), M.P. 264–265° C. with decomposition.

*Example 5.—3-ethyl-5-[4-(1-ethyl-2(1H)-quinolylidene-2-aza-2-butenylidene]rhodanine*

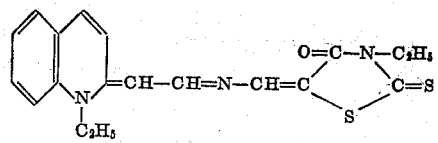

A mixture of 1.6 g. (1 mol.) of 5-acetanilidomethylene-3-ethylrhodanine, 1.6 g. (1 mol.) of 2-β-aminovinylquinoline ethiodide, 15 ml. of ethyl alcohol and 0.5 g. (1 mol.) of triethylamine was refluxed for 30 minutes. The reaction mixture was cooled, the solid filtered off and washed with methyl alcohol. The solid was extracted with two 50 ml. portions of hot methyl alcohol. The remaining crude dye was purified by dissolving in hot pyridine and precipitating with methyl alcohol. The yield of dark crystals with a bright reflex was 0.15 g. (8% yield), M.P. 254–255° C. with decomposition.

*Example 6.—4-aminomethylene-3-phenyl-5(4H)-isoxazolone*

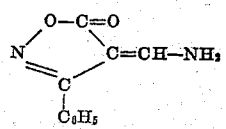

A suspension of 15.3 g. (1 mol.) of 4-acetanilidomethylene-3-phenyl-5(4H)-isoxazolone in 100 ml. of a saturated solution of alcoholic ammonia was heated to boiling and boiled for five minutes with ammonia gas being continually introduced. Disregarding the undissolved lumps, the reaction mixture was cooled, the yield filtered off and washed with ethyl alcohol. The yield of almost colorless crystals was 80% crude and 60% after recrystallization from ethyl alcohol, M.P. 197–198° C.

*Example 7.—4-[4-(3-ethyl-2(3H)-benzoxazolylidene)-2-aza-2-butenylidene]-3-phenyl-5(4H)-isoxazolone*

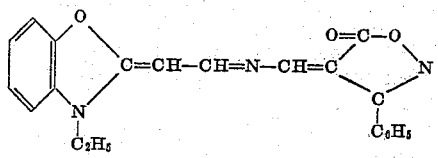

A mixture of 0.94 g. (1 mol.) of 4-aminomethylene-3-phenyl-5(4H)-isoxazolone, 2.2 g. (1 mol.) of 2-β-acetanilidovinylbenzoxazole ethiodide, 10 ml. of ethyl alcohol and 0.5 g. (1 mol.) of triethylamine was refluxed 5 minutes. The reaction mixture was cooled, the solid filtered off and washed with ethyl alcohol. The yield of dye was 33% crude and 17% after two recrystallizations from methyl alcohol. The yellow crystals melted at 221–222° C. with decomposition.

*Example 8.—4-[4-(1-ethyl-2(1H)-quinolylidene)-2-aza-2-butenylidene]-3-phenyl-5(4H)-isoxazolone*

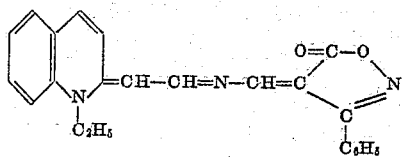

A mixture of 0.94 g. (1 mol.) of 4-aminomethylene-3-phenyl-5(4H)-isoxazolone, 2.2 g. (1 mol.) of 2-β-acetanilidovinylquinoline ethiodide, 10 ml. of ethyl alcohol and 0.5 g. (1 mol.) of triethylamine was refluxed for 5 minutes. The reaction mixture was cooled, the solid filtered off and washed with ethyl alcohol. The yield of dye was 11% crude and 7% after two recrystallizations from methyl alcohol. The steel blue needles with a bright reflex melted at 224–225° C. with decomposition.

*Example 9.—4-[4-(1-ethyl-4(1H)-quinolylidene)-2-aza-2-butenylidene]-3-phenyl-5(4H)-isoxazolone*

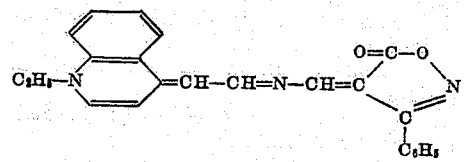

A mixture of 0.94 g. (1 mol.) of 4-aminomethylene-3-phenyl-5(4H)-isoxazolone, 2.0 g. (1 mol.) of 4-anilinovinylquinoline ethiodide, 10 ml. of ethyl alcohol, 0.5 g. (1 mol.) of acetic anhydride, and 1 g. (2 mols.) of triethylamine was refluxed for 5 minutes. The reaction mixture was cooled, the solid filtered off and washed with ethyl alcohol. The solid was extracted with 75 ml. of methyl alcohol and the remaining dye recrystallized from methyl alcohol. The yield of green needles with a bright reflex was 1%, M.P. 271–272° C. with decomposition.

*Example 10.—5-aminomethylene-3-ethyl-2-thio-2,4-oxazolidenedione*

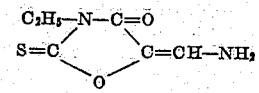

A suspension of 13.9 g. (1 mol.) of 5-acetanilidomethylene-3-ethyl-2-thio-2,4-oxazolidenedione in 150 ml. of a saturated solution of alcoholic ammonia was heated to boiling and the mixture refluxed for 30 minutes with ammonia gas continually being introduced. The reaction mixture was cooled, and the solid filtered off and discarded. The filtrate was concentrated to dryness and the residue taken up in benzene. The benzene solution was cooled and the solid filtered off. The yield of almost colorless crystals was 32%, M.P. 145–148° C.

*Example 11.—3-ethyl-5-[4-(3-ethyl-2(3H)-benzoxazolylidene)-2-aza-2-butenylidene]-2-thio-2,4-oxazolidenedione*

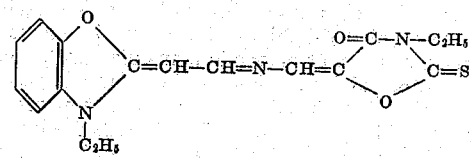

A mixture of 0.79 g. (1 mol.) of 5-aminomethylene-3-ethyl-2-thio-2,4-oxazolidenedione, 2.2 g. (1 mol.) of 2-β-acetanilidovinylbenzoxazole ethiodide, 10 ml. of ethyl alcohol and 0.5 g. (1 mol.) of triethylamine was refluxed for 5 minutes. The reaction mixture was cooled, the solid was filtered off and washed with ethyl alcohol. The yield of dye was 15% crude and 8% after two recrystallizations from methyl alcohol. The orange needles melted at 241–243° C. with decomposition.

*Example 12.—3-ethyl-5-[4-(3-ethyl-2(3H)-benzothiazolylidene)-2-aza-2-butenylidene]-2-thio-2,4-oxazolidenedione*

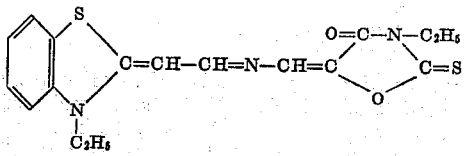

A mixture of 0.79 g. (1 mol.) of 5-aminomethylene-3-ethyl-2-thio-2,4-oxazolidenedione, 2.25 g. (1 mol.) of 2-β-acetanilidovinylbenzothiazole ethiodide, 10 ml. of ethyl alcohol and 0.5 g. (1 mol.) of triethylamine was refluxed for 5 minutes. The reaction mixture was cooled and the supernatant liquid decanted. The sticky residue was stirred with 30 ml. of methyl alcohol, whereupon the residue became crystalline. After cooling, the crystals were filtered off and washed with methyl alcohol. The yield of dye was 53% crude and 28% after being precipitated from a hot pyridine solution with methyl alcohol. The fine maroon crystals melted at 202–203° C. with decomposition.

*Analysis.*—Calc'd. for $C_{17}H_{17}N_3O_2S_2$: C, 56.81; H, 4.77. Found: C, 56.9; H, 5.2.

*Example 13.*—3 - ethyl - 5 - [4 - (3 - methyl - 2(3H)-thiazolinylidene) - 2 - aza - 2 - butenylidene] - 2 - thio-2,4-oxazolidenedione

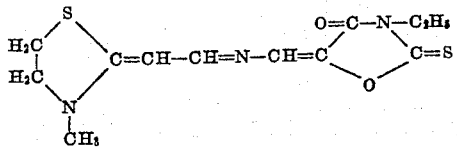

A mixture of 0.79 g. (1 mol.) of 5-aminomethylene-3-ethyl-2-thio-2,4-oxazolidenedione, 1.1 g. (1 mol.) of 2-β-anilinovinylthiazoline methiodide, 10 ml. of ethyl alcohol, 0.5 g. (1 mol.) of acetic anhydride and 1 g. (2 mols.) of triethylamine was refluxed for 5 minutes. The reaction mixture was cooled, the solid was filtered off and washed with ethyl alcohol. The yield of dye was 35% crude and 16% after two recrystallizations from methyl alcohol. The orange crystals melted at 232–233° C. with decomposition.

*Analysis.*—Calc'd for $C_{12}H_{15}N_3O_2S$: C, 48.48; H, 5.09. Found: C, 48.8; H, 5.5.

*Example 14.*—5-aminomethylene-1,3-diethyl-2-thiobarbituric acid

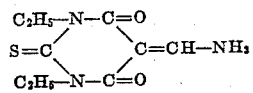

A suspension of 17.25 g. (1 mol.) of 5-acetanilido-methylene-1,3-diethyl-2-thiobarbituric acid in 150 ml. of a saturated solution of alcoholic ammonia was heated to boiling and boiled for 5 minutes with ammonia gas continually being introduced. The reaction mixture was cooled, the solid was filtered off and washed with ethyl alcohol. The yield was 100% crude and 83% after recrystallization from ethyl alcohol. The yellow crystals melted at 250–251° C.

*Analysis.*—Calc'd. for $C_9H_{13}N_3O_2S$: C, 47.55; H, 5.76. Found: C, 47.6; H, 6.0.

*Example 15.*—1,3 - diethyl - 5 - [4 - (3 - ethyl - 2(3H)-benzoaxazolylidene) - 2 - aza - 2 - butenylidene] - 2 - thiobarbituric acid

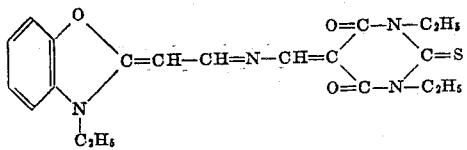

A mixture of 1.15 g. (1 mol.) of 5-aminomethylene-1,3-diethyl-2-thiobartiburic acid, 2.2 g. (1 mol.) of 2-β-acetanilidovinylbenzoxazole ethiodide, 10 ml. of ethyl alcohol and 0.5 g. (1 mol.) of triethylamine was refluxed for 5 minutes. The reaction mixture was cooled, the solid was filtered off and washed with ethyl alcohol. The crude dye was purified by dissolving in hot pyridine and precipitating with methyl alcohol. After repeating this treatment twice more, the dye was further purified by floating some fine yellow crystals away from some larger colorless crystals with ligroin. The yield of fine yellow crystals was 3.5% M.P. 275–277° C. with decomposition.

*Example 16.*—1,3 - diethyl - 5 - [4 - (3 - ethyl - 2(3H)-benzothiazolylidene) - 2 - aza - 2 - butenylidene] - 2 - thiobarbituric acid

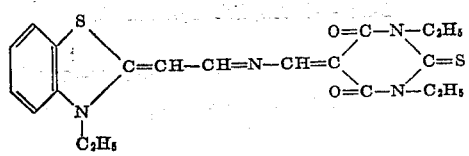

A mixture of 1.15 g. (1 mol.) of 5-aminomethylene-1,3-diethyl-2-thiobarbituric acid, 2.25 g. (1 mol.) of 2-β-acetanilidovinyl benzothiazole ethiodide, 10 ml. of ethyl alcohol and 0.5 g. (1 mol.) of triethylamine was refluxed for five minutes. The reaction mixture was cooled, the solid filtered off and washed with methyl alcohol. The crude dye was dissolved in hot pyridine and precipitated with methyl alcohol. After filtering and drying, the dye was extracted with an insufficient amount of hot pyridine for complete solution, filtered, and the dye precipitated with methyl alcohol. After repeating this extraction and precipitation, the yield was 11%. The orange crystals melted at 314–315° C. with decomposition.

*Example 17.*—1,3 - diethyl - 5 - [4 - (1 - ethyl - 2(1H)-naphtho[1,2] - thiazolylidene) - 2 - aza - 2 - butenylidene] - 2 - thiobarbituric acid

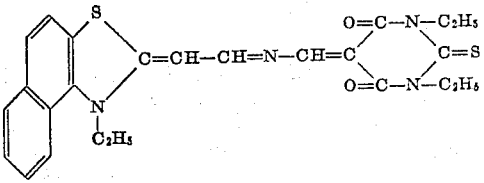

A mixture of 1.15 g. (1 mol.) of 5-aminomethylene-1,3-diethyl-2-thiobarbituric acid, 2.5 g. (1 mol.) of 2-β-anilinovinylnaphtho[1,2]thiazole ethiodide, 10 ml. of ethyl alcohol, 0.5 g. (1 mol.) of acetic anhydride and 1 g. (2 mols.) of triethylamine was refluxed for 5 minutes. The reaction mixture was cooled, the solid was filtered off and washed with methyl alcohol. The crude dye was purified by dissolving in hot pyridine and precipitating with methyl alcohol. The yield of maroon needles with a green reflex was 6%, M.P. 312–313° C. with decomposition.

*Example 18.*—1,3-diethyl-5-[4-(3-ethyl-2(3H)-benzoselenazolylidene) - 2 - aza - 2 - butenylidene] - 2 - thiobarbituric acid

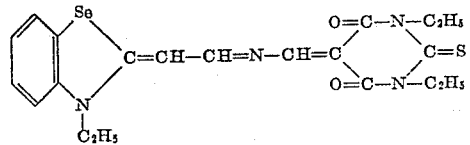

A mixture of 1.15 g. (1 mol.) of 5-aminomethylene-1,3-diethyl-2-thiobarbituric acid, 2.5 g. (1 mol.) of 2-β-acetanilidovinylbenzoselenazole ethiodide, 10 ml. of ethyl alcohol and 0.5 g. (1 mol.) of triethylamine was refluxed 5 minutes. The reaction mixture was cooled, the solid was filtered off and washed with ethyl alcohol. The crude dye was purified by dissolving in hot pyridine and precipitating with methyl alcohol. The yield of fine brick-red needles was 6%, M.P. 298–299° C. with decomposition.

*Example 19.*—1,3 - diethyl - 5 - [4 - (1 - ethyl - 2(1H) - quinolylidene) - 2 - aza - 2 - butenylidene] - 2 - thiobarbituric acid

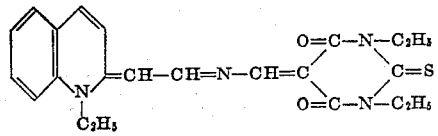

A mixture of 1.15 g. (1 mol.) of 5-aminomethylene-1,3-diethyl-2-thiobarbituric acid, 2.2 g. (1 mol.) of 2-β-acetanilidovinylquinoline ethiodide, 10 ml. of ethyl alcohol and 0.5 g. (1 mol.) of triethylamine was refluxed for 5 minutes. The reaction mixture was cooled, the solid was filtered off and washed with ethyl alcohol. The solid was extracted twice with 50 ml. of methyl alcohol, and the extracts discarded. The remaining dye was purified by dissolving in hot pyridine and precipitating with methyl alcohol. The yield of fine red needles was 5%, M.P. 322–323° C. with decomposition.

Example 20.—5 - [ 4 - (5 - chloro - 3 - ethyl - 2(3H)-benzothiazolylidene) - 2 - aza - 2 butenylidene] - 1,3-diethyl-2-thiobarbituric acid

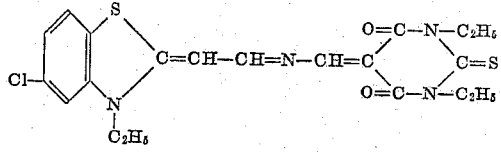

A mixture of 1.15 g. (1 mol.) of 5-aminomethylene-1,3-diethyl-2-thiobarbituric acid, 2.4 g. (1 mol.) of 2-β-acetanilidovinyl-5-chlorobenzothiazole ethiodide, 15 ml. of ethyl alcohol and 0.5 g. (1 mol.) of triethylamine was refluxed for 5 minutes. The reaction mixture was cooled, the solid filtered off and washed with ethyl alcohol. The solid was extracted with 20 ml. of hot pyridine and the dye was precipitated from the pyridine solution with methyl alcohol. After repeating this extraction and precipitation, the yield of pure dye was 4%. The orange needles melted at 285–286° C. with decomposition.

Example 21.—1,3 - diethyl - 5 -[4 - (1 - ethyl - 4(1H)-quinolylidene) - 2 - aza - 2 - butenylidene] - 2 - thiobarbituric acid

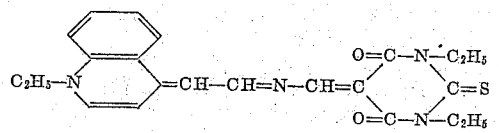

A mixture of 1.15 g. (1 mol.) of 5-aminoethylene-1,3-diethyl-2-thiobarbituric acid, 2 g. (1 mol.) of 4-β-anilinovinylquinoline ethiodide, 15 ml. of ethyl alcohol, 0.5 g. (1 mol.) of acetic anhydride and 1 g. (2 mols.) of triethylamine was refluxed for 5 minutes. The reaction mixture was cooled. The solid was extracted with 50 ml. of hot methyl alcohol and the extract discarded. The remaining dye was dissolved in hot pyridine and precipitated with methyl alcohol. The yield of pure dye was 3% and the blue crystals with a green reflex melted at 278–279° C. with decomposition.

It has also been found that the intermediates of Formula IV above can be condensed with a compound selected from those represented by the following general formula:

(VI)

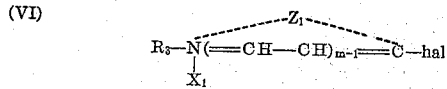

wherein $R_3$ represents an alcohol radical (including those listed above for R), $Z_1$ represents the non-metallic atoms necessary to complete a heterocyclic nucleus containing from 5 to 6 atoms in the heterocyclic ring (including those listed above for Z), $X_1$ represents an acid radical (including those listed above for X), $m$ represents a positive integer of from 1 to 2, and hal represents a halogen atom, such as iodide, to provide azacarbocyanine dyes. These condensations can be carried out under the same conditions illustrated in Examples 1 to 21 above.

It has also been found that the intermediates of Formula II can be condensed with the intermediates of Formula IV to provide azadicarbocyanine dyes. In like manner, these condensations can be carried out under the conditions illustrated above in Examples 1 to 21.

It has also been found that azacarbocyanine dyes can be prepared by condensing an intermediate selected from those represented by Formula II above with a compound selected from those represented by the following general formula:

(VII)

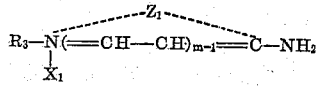

wherein $R_3$, $Z_1$, $X_1$ and $m$ each have the values given above. These condensations can likewise be carried out under conditions such as those illustrated in Examples 1 to 21 above.

The following examples will serve to illustrate the preparation of azacarbocyanine and azadicarbocyanine dyes using the intermediates of Formula VI and those of Formula VII.

Example 22.—2-aminovinylbenzothiazole ethiodide

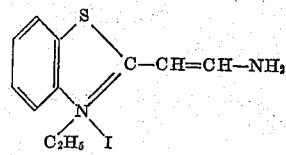

2-β-acetanilidovinylbenzothiazole ethiodide (45 g.; 1 mol.) was suspended in saturated alcoholic ammonia (150 cc.) and the suspension heated to boiling while gaseous ammonia was passed through. It was boiled for ten minutes during which time most of the solid dissolved. The hot mixture was filtered and the solid extracted with a further 250 cc. portion of alcoholic ammonia. The filtrates were combined and cooled to 0° C. The solid which separated was filtered off and washed with ethyl alcohol. A second crop was obtained by concentrating the filtrate to 75 cc., chilling and filtering. The product was obtained as dark crystals, 27.2 g. (80%). A sample was dissolved in ethyl alcohol (30 cc./g.), treated with Norite decolorizing carbon, cooled and filtered. Dark red crystals, (54%), M.P. 213–215° C.

Analysis.—Calc'd for $C_{11}H_{13}IN_2S$: I, 38.20. Found: I, 37.8.

Example 23.—1'-3-diethyl-10-aza-thia-2'carbocyanine iodide

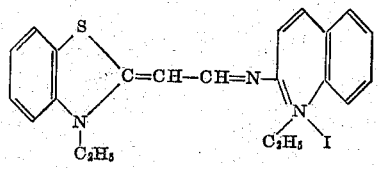

2-β-aminovinylbenzothiazole ethiodide (3.32 g.; 1 mol.), 2-iodoquinoline ethiodide (4.1 g.; 1 mol.), ethyl alcohol (25 ml.), and triethylamine (2.02 g.; 2 mol.) were refluxed for ten minutes. The reaction mixture was chilled and the solid filtered off and washed with methyl alcohol. A yield of 4.2 g. (89%) was obtained. Brown crystals of M.P. 268–269° C., with decomposition were obtained by recrystallization from methyl alcohol.

Analysis.—Calc'd for $C_{22}H_{22}IN_3S$: I, 26.04. Found: I, 26.1.

The same dye was prepared as follows:

2-aminoquinoline ethiodide (0.75 g.; 1 mol.), 2-β-acetanilidovinylbenzothiazole ethiodide (1.1 g.; 1 mol.), ethyl alcohol (10 ml.) and triethylamine (0.50 g.; 2 mol.) were refluxed for ten minutes. The reaction mixture was chilled, and the solid filtered off and washed with methyl alcohol. A crude yield of 1.1 g. (93%) was obtained. The dye was recrystallized from methyl alcohol and had a M.P. of 268–269° C. with decomposition.

Example 24.—3,3'-diethyl-10-aza-thiadicarbocyanine iodide

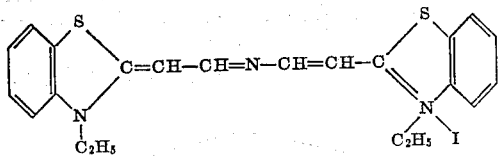

2-β-aminovinylbenzothiazole ethiodide (3.3 g.; 1 mol.), 2 - β - acetanilidovinylbenzothiazole ethiodide (4.5 g.; 1 mol.), ethyl alcohol (15 ml.) and triethylamine (1.0 g.; 1 mol.) were refluxed for ten minutes. The reaction mixture was cooled and the solid filtered off and washed with methyl alcohol to give 4.7 g. (90%) of crude dye. After recrystallization from methyl alcohol, the dye was obtained as green crystals M.P. 252–253° C. with decomposition.

Analysis.—Calc'd for $C_{22}H_{22}IN_3S_2$: I, 24.43. Found: I, 24.8.

Example 25.—3,3'-diethyl-10-aza-oxathiadicarbocyanine iodide

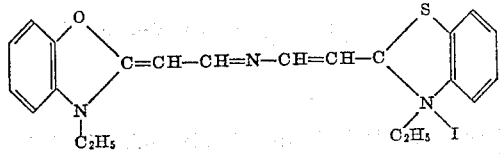

2-β-aminovinylbenzothiazole ethiodide (1.6 g.; 1 mol.), 2-β-acetanilidovinylbenzoxazole ethiodide (4.3 g.; 2 mol.), ethyl alcohol (20 ml.) and triethylamine (0.5 g.; 1 mol.) were refluxed for two minutes. The reaction mixture was cooled and the solid filtered off, washed with ethyl alcohol, water, and then ethyl alcohol to give 2.1 g. (82%) of crude dye. After recrystallization from methyl alcohol, the dye was obtained as green needles with a bright reflex, M.P. 190–192° C. with decomposition.

Analysis.—Calc'd for $C_{22}H_{22}IN_3OS$: I, 25.2. Found: I, 24.8.

As indicated above, many of the dyes of our invention are particularly useful in manufacturing photographic silver halide emulsions, serving to alter the sensitivity thereof. Sensitization by means of our new dyes is, of course, directed primarily to the ordinarily-employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvents must, of course, be compatible with the emulsion and substantially free from any deleterious effect on the light-sensitive materials. Pyridine has proven satisfactory as a solvent for many of our new dyes.

The concentration of our new dyes in the emulsion can vary widely, i.e., from about 5 to about 200 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 10 to 200 mgs. of dye per mole of silver halide (or even as high as 1 g./mole silver halide for fine-grain emulsions) is slowly added to about 1000 cc. of a gelatino-silver-halide emulsion, with stirring. Stirring is continued until the dye is uniformly distributed throughout the emulsion. With most of our new dyes, 10 to 100 mgs. of dye per liter of emulsion suffice to produce the maximum sensitizing effect with the ordinary gelatino-silver-bromide (including bromiodide) emulsions. With fine-grain emulsions, which include most of the ordinarily-employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily-employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents, W. D. Baldsiefen 2,540,085, granted February 6, 1951; R. E. Damschroder 2,597,856, granted May 27, 1952; and H. C. Yutzy et al. 2,597,915, granted May 27, 1952), various palladium compounds, such as palladium chloride (W. D. Baldsiefen U. S. 2,540,086, granted February 6, 1951), potassium chloropalladate (R. E. Stauffer et al. U. S. 2,598,079, granted May 27, 1952), etc., or mixtures of such sensitizers; antifoggants, such as ammonium chloroplatinate (A. P. H. Trivelli et al. U. S. 2,566,245, granted August 28, 1951), ammonium chloroplatinite (A. P. H. Trivelli et al. U.S. 2,566,263, granted August 28, 1951), benzotriazole, nitrobenzimidazole, 5-nitroindazole, benzidine, mercaptans, etc. (see Mees—"The Theory of the Photographic Process," Macmillan Pub., 1942, page 460), or mixture thereof; hardeners, such as formaldehyde (A. Miller U.S. 1,763,533, granted June 10, 1930), chrome alum (U.S. 1,763,533), glyoxal (J. Brunken U.S. 1,870,354, granted August 9, 1932), dibromacrolein (O. Block et al. Br. 406,750, accepted March 8, 1934), etc.; color couplers, such as those described in I. F. Salminen et al. U.S. Patent 2,423,730, granted July 7, 1947; Spence and Carroll U.S. Patent 2,640,776, issued June 2, 1953; etc.; or mixtures of such addenda. Dispersing agents for color couplers, such as those set forth in U.S. patents, E. E. Jelley et al. 2,322,027, granted June 15, 1943, and L. D. Mannes et al. 2,304,940, granted December 15, 1942, can also be employed in the above-described emulsions.

The following data will serve to illustrate the marked improvement in sensitivity of the thiobarbituric acid dyes of our invention over the corresponding dyes containing a 5-membered acidic nucleus. The data in the tabulation were obtained by sensitizing an ordinary gelatino-silver-bromiodide emulsion to its optimum, or near optimum, with each of the dyes illustrated in the table. The separate batches of emulsions were then coated on a conventional photographic support, such as cellulose acetate, and then dried. Generally, the emulsions were heated at about 50 to 52° C. for a few minutes before the emulsions were coated on the supports. The coated emulsions were then exposed in an intensity-scale sensitometer, such as an Eastman Type Ib Sensitometer for about 1/25 second to daylight quality illumination filtered either by a filter transmitting only green light (such as a Wratten No. 58 Filter) or through a filter transmitting only green and red light ("minus blue" light, such as that provided by a Wratten No. 12 Filter).

The exposed emulsions were then processed in the normal manner in a black-and-white photographic developer, such as Kodak Developer D-19. The speed differences between the coatings containing the dyes of our invention and those of emulsions containing dyes containing 5-membered heterocyclic rings in the acetic portion of the molecule are illustrated in the table in terms of steps of speed difference. One step means a speed difference of about 100%. A large step number indicates a higher speed than a lower step number.

| Example No. | Sensitizing Data | | Relative Speed | |
|---|---|---|---|---|
| | to m$\mu$ | max. m$\mu$ | Green steps | Minus Blue steps |
| 21 | 650 | 580 | 7 | 11 |
| 3 | 640 | 580 | 6 | 9 |
| | | | *1 | *2 |
| 20 | 560 | 530 | 10 | 9 |
| 11 | 550 | 520 | 6 | 6 |
| | | | *4 | *3 |
| 19 | 580 | 550 | 10 | 11 |
| 12 | 580 | 560 | 7 | 9 |
| | | | *3 | *2 |
| 17 | 580 | 550 | 9 | 10 |
| 12 | 580 | 560 | 7 | 8 |
| | | | *2 | *2 |
| 16 | 560 | 530 | 11 | 11 |
| 11 | 550 | 520 | 6 | 6 |
| | | | *5 | *5 |
| 15 | 530 | 500 | 13 | 9 |
| 13 | 540 | 510 | 3 | 2 |
| | | | *10 | *7 |
| 17 | 580 | 550 | 9 | 10 |
| 2 | 570 | 540 | 5 | 7 |
| | | | *4 | *3 |
| 20 | 560 | 530 | 10 | 9 |
| 2 | 570 | 540 | 5 | 7 |
| | | | *5 | *2 |
| 19 | 580 | 550 | 10 | 11 |
| 2 | 570 | 540 | 5 | 7 |
| | | | *5 | *4 |
| 16 | 560 | 530 | 11 | 11 |
| 2 | 570 | 540 | 5 | 7 |
| | | | *6 | *4 |
| 15 | 530 | 500 | 13 | 9 |
| 11 | 550 | 520 | 6 | 6 |
| | | | *7 | *3 |

* Steps gain in favor of the azamerodiacrbocyanine from 1,3-diethyl-2-thiobarbituric acid.

The sensitizing effects of our new dyes are further illustrated schematically in the accompanying drawing, wherein the solid curve in each of the figures represents the sensitivity conferred on an ordinary gelatino-silver-halide developing-out emulsion by one of our new dyes.

In Figure 1, the curve represents the sensitivity of an ordinary gelatino-silver-bromiodide emulsion sensitized with 1,3-diethyl-5-[(3-ethyl-2-(3H)-benzoxazolylidene)-2-aza-2-butenylidene]-2-thiobarbituric acid. The preparation of the dye identified in Figure 1 is given in Example 15 above.

In Figure 2, the curve represents the sensitivity of an ordinary gelatino-silver-bromiodide emulsion sensitized with 1,3-diethyl-5-[(3-ethyl-2(3H)-benzothiazolylidene)-2-aza-2-butenylidene]-2-thiobarbituric acid. The preparation of the dye identified in Figure 2 is given in Example 16 above.

In Figure 3, the curve represents the sensitivity of an ordinary gelatino-silver-bromiodide emulsion sensitized with 1,3-diethyl-5-[(4-(1-ethyl-2(1H)-naphtho[1,2]thiazolylidene)-2-aza-2-butenylidene]-2-thiobarbituric acid. The preparation of the dye identified in Figure 3 is given in Example 17 above.

The emulsions containing the novel sensitizing dyes of our invention can be coated on ordinary photographic supports, including paper, metal plates, transparent films (e.g., cellulose ester film, polyvinyl acetal film, polystyrene film, polyester film, polypropylene film, etc.), etc. Since the formation of static charges on polymeric films is a major problem, it has been found that the harmful effects of static electricity can be overcome by applying a removable graphite antistatic coating to the rear surface of the film base. Removable coatings can be made by applying a thin layer of polyvinylpyridine to the support and overcoating this with an aqueous dispersion of colloidal graphite, with or without added hydrophilic colloid to the colloidal dispersion. Non-removable graphite backings can be applied by coating an aqueous or non-aqueous suspension of colloid graphite (e.g., in isopropyl alcohol, dimethylsulfoxide, etc., alone or in admixture with an auxiliary solvent, such as tetrahydrofurfuryl acetate) on the film base, the coating mixture containing a liquid having a slight solvent action for the film base. The non-removable coating can then be buffed with a cotton cloth in order to remove surplus graphite and to achieve the desired antistatic effect.

The invention has been described in detail with particular reference to preferred embodiments thereof, but it will be understood that variations and modifications can be effected within the spirit and scope of the invention as described hereinabove and as defined in the appended claims.

What we claim as our invention and desire secured by Letters Patent of the United States is:

1. A photographic silver halide emulsion containing a polymethine dye selected from the class represented by the following general formula:

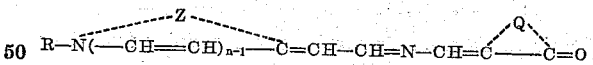

$$R-N(-CH=CH)_{n-1}-C=CH-CH=N-CH=C\cdots C=O$$

wherein R represents an alkyl group, $n$ represents a positive integer of from 1 to 2, Q represents the non-metallic atoms necessary to complete a 2-thiobarbituric acid nucleus and Z represents the non-metallic atoms necessary to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus and a 4-pyridine nucleus.

2. A photographic silver halide emulsion as defined in claim 1, wherein said emulsion is a gelatino-silver-halide developing-out emulsion.

3. A photographic gelatino-silver-halide developing-out emulsion according to claim 2, wherein said silver halide is silver bromiodide.

4. A gelatino-silver-halide developing-out emulsion according to claim 2, wherein said silver halide is silver chlorobromide.

5. A photographic silver halide emulsion containing a polymethine dye selected from the class represented by the following general formula:

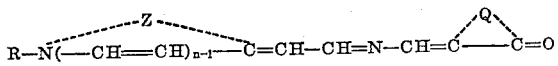

wherein R represents an alkyl group containing from 1 to 4 carbon atoms, n represents a positive integer of from 1 to 2, Q represents the non-metallic atoms necessary to complete a 1,3-dialkyl-2-thiobarbituric acid nucleus, wherein said alkyl groups contain from 1 to 7 carbon atoms, and Z represents the non-metallic atoms necessary to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus and a 4-pyridine nucleus.

6. A photographic silver halide emulsion containing a polymethine dye selected from the class represented by the following general formula:

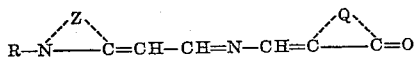

wherein R represents an alkyl group containing from 1 to 4 carbon atoms, Q represents the non-metallic atoms necessary to complete a 2-thiobarbituric acid nucleus and Z represents the non-metallic atoms necessary to complete a benzoxazole nucleus.

7. A photographic silver halide emulsion containing a polymethine dye represented by the following formula:

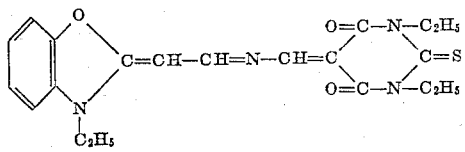

8. A photographic silver halide emulsion containing a polymethine dye selected from the class represented by the following general formula:

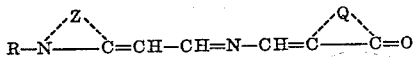

wherein R represents an alkyl group containing from 1 to 4 carbon atoms, Q represents the non-metallic atoms necessary to complete a 2-thiobarbituric acid nucleus and Z represents the non-metallic atoms necessary to complete a benzothiazole nucleus.

9. A photographic silver halide emulsion containing a polymethine dye represented by the following formula:

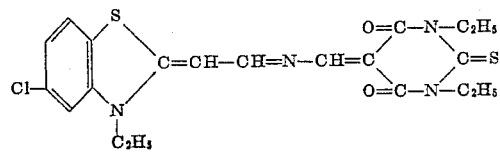

10. A photographic silver halide emulsion containing a polymethine dye represented by the following formula:

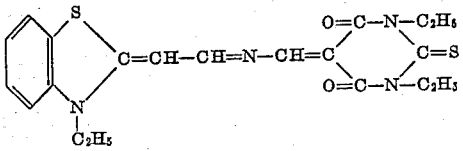

11. A photographic silver halide emulsion containing a polymethine dye selected from the class represented by the following general formula:

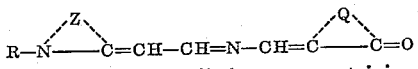

wherein R represents an alkyl group containing from 1 to 4 carbon atoms, Q represents the non-metallic atoms necessary to complete a 2-thiobarbituric acid nucleus and Z represents the non-metallic atoms necessary to complete a naphthothiazole nucleus.

12. A photographic silver halide emulsion containing a polymethine dye represented by the following formula:

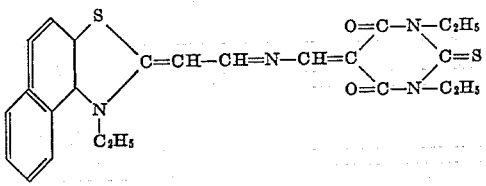

13. A photographic silver halide emulsion containing a polymethine dye selected from the class represented by the following general formula:

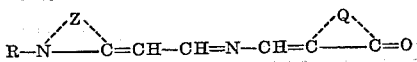

wherein R represents an alkyl group containing from 1 to 4 carbon atoms, Q represents the non-metallic atoms necessary to complete a 2-thiobarbituric acid nucleus and Z represents the non-metallic atoms necessary to complete a 2-quinoline nucleus.

14. A photographic silver halide emulsion containing a polymethine dye represented by the following formula:

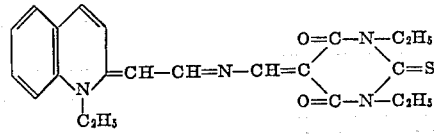

References Cited in the file of this patent
UNITED STATES PATENTS

| | | |
|---|---|---|
| 2,153,930 | Kendall | Apr. 11, 1939 |
| 2,166,736 | White et al. | July 18, 1939 |
| 2,706,193 | Sprague | Apr. 12, 1955 |
| 2,739,147 | Keys | Mar. 20, 1956 |

OTHER REFERENCES

Chemical Abstracts, 16, p. 3101. (Abstract of Brit. Med. Journal, 1922, I, pp. 514–515.)
Chemical Abstracts, 19, p. 530. (Abstract of Proc. Roy. Soc., London, 96B, pp. 317–333.)